(12) United States Patent
Crabtree et al.

(10) Patent No.: US 6,375,849 B1
(45) Date of Patent: *Apr. 23, 2002

(54) INTEGRATED ENVIRONMENTAL CONTROL SYSTEM AND HUMIDIFICATION SYSTEM

(75) Inventors: Ron Crabtree, Rancho Palos Verdes; Jim Beals, Torrance; Gary Kumagai, San Jose; Robert Tom, Redondo Beach; Stan Pollitt, Palos Verdes, all of CA (US)

(73) Assignee: AlliedSignal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,386

(22) Filed: Mar. 25, 1999

Related U.S. Application Data

(60) Provisional application No. 60/080,639, filed on Apr. 3, 1998.

(51) Int. Cl.⁷ .............................................. B64D 13/00
(52) U.S. Cl. ...................... 210/652; 210/195.2; 454/71; 454/76; 454/157; 261/DIG. 2
(58) Field of Search .............................. 210/652, 195.2; 244/118.5; 454/71, 76, 157, 74, 75; 62/DIG. 5; 261/DIG. 2, 128, 129, 131

(56) References Cited

U.S. PATENT DOCUMENTS

| | | | | |
|---|---|---|---|---|
| 2,479,766 A | * | 8/1949 | Mulvany | |
| 3,630,378 A | * | 12/1971 | Bauman | |
| 4,437,318 A | * | 3/1984 | Werjefelt | |
| 4,564,375 A | * | 1/1986 | Munk et al. | |
| 4,871,452 A | * | 10/1989 | Kohler et al. | |
| 5,443,733 A | * | 8/1995 | Mueller et al. | |
| 5,516,330 A | * | 5/1996 | Dechow et al. | |
| 5,524,848 A | * | 6/1996 | Ellsworth | |

FOREIGN PATENT DOCUMENTS

GB          2258299      * 2/1993

* cited by examiner

Primary Examiner—Ana Fortuna
Assistant Examiner—Richard W. Ward
(74) Attorney, Agent, or Firm—William J. Zak, Jr. Esq.

(57) ABSTRACT

In an aircraft, tap water is filtered, vaporized and injected into a trim line of an environmental control system. Filtering is performed by a reverse osmosis filter. Hot, humidified air leaving the trim line is supplied to a cabin of the aircraft.

13 Claims, 3 Drawing Sheets

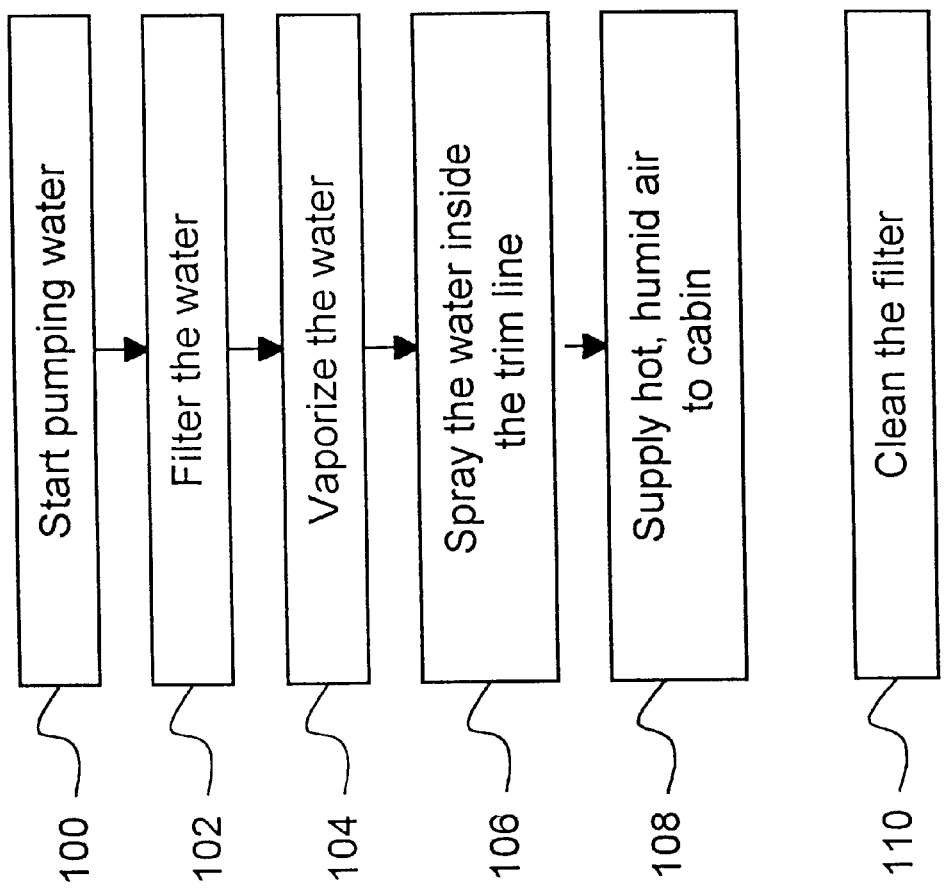

INTEGRATED ENVIRONMENTAL CONTROL SYSTEM AND HUMIDIFICATION SYSTEM

This application claims benefit from U.S. Provisional Application No. 60/080,639 which was filed Apr. 3, 1998.

BACKGROUND OF THE INVENTION

The invention relates to an environmental control system. The invention also relates to a system for increasing the humidity of air inside an aircraft.

An environmental control system for an aircraft is designed to control airflow into the aircraft's passenger cabin as well as air temperature inside the passenger cabin. Most aircraft environmental control systems operate on an air cycle refrigeration principle. Compressed air is obtained from a compressor stage of the aircraft's main engine, an auxiliary power unit or some other source of air. The compressed air is cooled with ambient air to near-ambient temperature in an air-to-air heat exchanger and then expanded in an air cycle machine. Leaving the environmental control system is a stream of cooled, conditioned air, which is supplied to the passenger cabin. Although somewhat expanded, the conditioned air also pressurizes the passenger cabin.

The environmental control system also removes water vapor entrained in the air that is eventually supplied to the passenger cabin. For example, high pressure water separation can be performed on the air prior to expansion in the air cycle machine, or low pressure water separation can be performed on air leaving the air cycle machine. Removing the water vapor results in lower cabin humidity.

In certain instances, however, it might actually be desirable to increase the humidity of the air inside the passenger cabin. The air within the aircraft cabin can become dry during cruise operation. Relative humidity below 10% can occur due to low ambient humidity at altitude and excess removal of water by the environmental control system. The low humidity can cause dryness of the eyes, nose, skin and throat and other forms of discomfort for passengers and crew members inside the cabin. The American Society of Heating, Refrigeration and Air Conditioning Engineers (ASHRAE) recommends a relative humidity between 30% and 60%.

However, a typical environmental control system does not increase the humidity of dry air inside the cabin.

SUMMARY OF THE INVENTION

Humidity of air inside an aircraft cabin can be increased by the present invention, which can be regarded as an integrated system including an environmental control system and a humidification system. The environmental control system includes a trim line. The humidification system includes a reverse osmosis filter, and a pump for controllably pumping water through the reverse osmosis filter. Water filtered by the reverse osmosis filter is added into the trim line of the environmental control system.

BRIEF DESCRIPTION OF THE DRAWINGS

FIG. 3 is a flowchart of a method of operating the integrated environmental control system and humidification system.

DETAILED DESCRIPTION OF THE INVENTION

Figure 1:
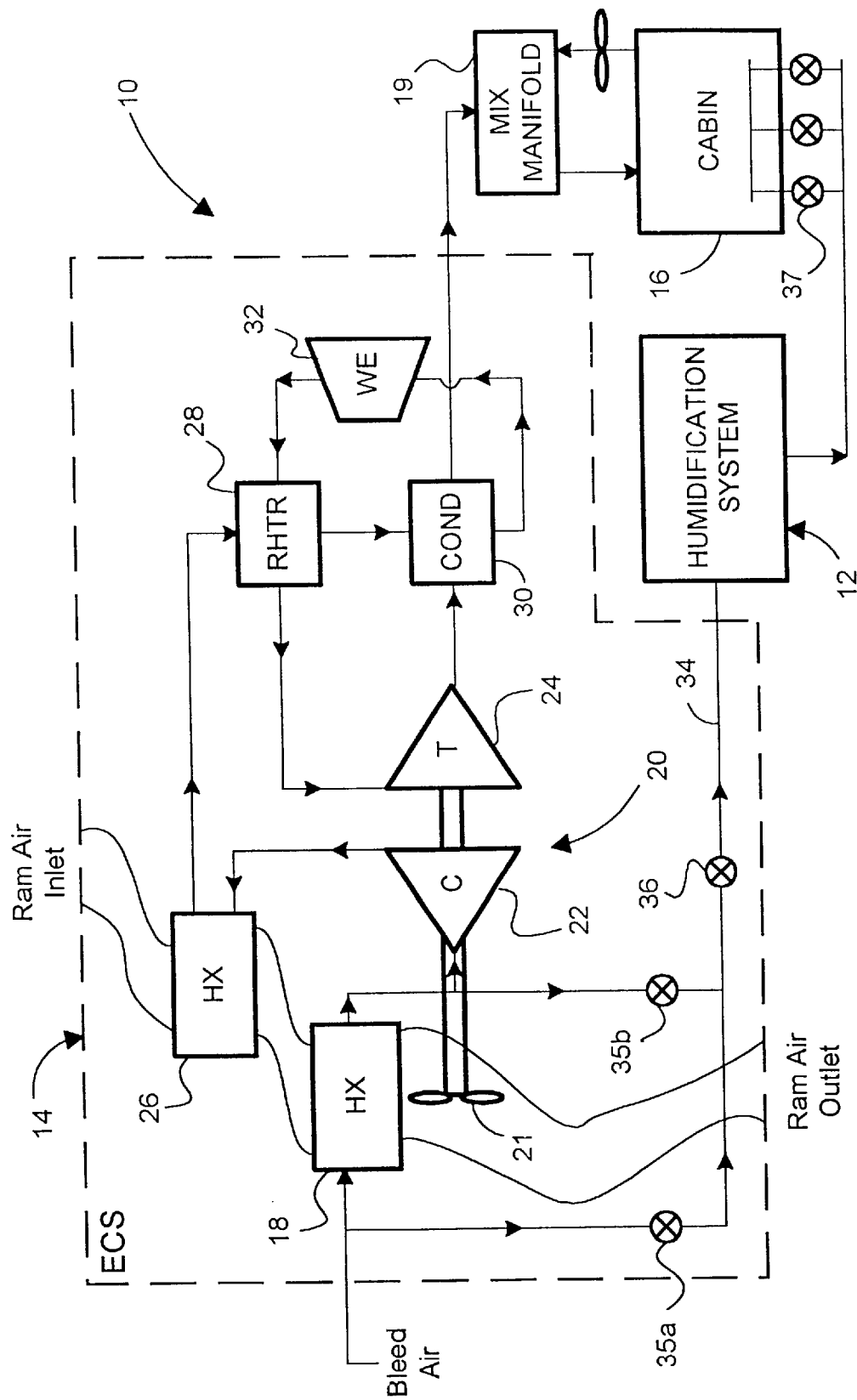
FIG. 1 is a block diagram of an environmental control system that is integrated with a humidification system.

FIG. 1 shows an integrated system 10 including a humidification system 12 and an environmental control system (ECS) 14 for the cabin 16 of an aircraft. Hot bleed air is supplied to the ECS 14 from a compressor stage of an aircraft engine, an auxiliary power unit or some other source of air such as a ground cart (not shown). The bleed air is cooled in a primary air-to-air heat exchanger 18. Bleed air leaving the primary air-to-air heat exchanger 18 is cooled and conditioned within the ECS 14. Cooled, conditioned air leaving the ECS 14 is supplied to a mix manifold 19. The mix manifold 19 mixes the cooled air with recirculated air from the aircraft cabin 16. Air leaving the mix manifold 19 is supplied to the aircraft cabin 16.

The ECS 14 includes an air cycle machine 20 and water separation equipment for cooling and conditioning the bleed air. FIG. 1 shows, by way of example, a three-wheel bootstrap air cycle machine 20 including a fan 21, a compressor 22 and a turbine 24, and equipment 26, 28, 30, 32 for performing high pressure water separation. Hot side outlet air of the primary heat exchanger 18 is compressed by the compressor 22 and supplied to a hot side of a secondary air-to-air heat exchanger 26. In the secondary air-to-air heat exchanger 26, heat of compression is removed and dumped to ambient.

Air leaving the hot side of the secondary air-to-air heat exchanger 26 is supplied to a hot side of a reheater 28, where additional heat is removed. Air leaving the hot side of the reheater 28 is supplied to a hot side of a condenser 30, which causes moisture entrained in the air to form condensate. Higher pressure resulting from the compressor 22 enhances the formation of condensate and reduces the presence of vapor in the air.

Air leaving the condenser 30 is supplied to a water extractor 32. Inside the water extractor 32, a vaned swirl section centrifuges the condensate against a duct wall, causing the condensate to be trapped in an annular space formed by a duct wall liner that begins downstream of the vaned swirl section. Condensate removed from the air can be dumped overboard or sprayed onto the secondary heat exchanger 26.

Dehumidified air leaving the water extractor 32 is supplied to a cold side of the reheater 28 and reheated. Reheating puts more energy into the dehumidified air, which allows for greater cooling in the turbine 24. Additionally, reheating increases turbine reliability by minimizing the formation of ice on the wheel of the turbine 24.

Air leaving the hot side of the reheater 28 is expanded and cooled in the turbine 24. Shaft power resulting from the expansion in the turbine 24 is used to drive the fan 21 and the compressor 22. Air leaving the turbine 24 is supplied to a cold side of the condenser 30. Cooled, conditioned air leaving the cold side of the condenser 30 is supplied to the mix manifold 19.

The ECS 10 further includes a trim line 34 that supplies warm or hot air to the cabin 16. Hot air from the hot side outlet of the primary heat exchanger 18 can be supplied to the trim line 34 via a valve 35b. Hotter air from the hot side inlet of the primary heat exchanger 18 can be supplied to the trim line 34 via a valve 35a. A temperature control valve 36 allows controllable amounts of warm or hot air to bypass the air cycle machine 20 and flow directly to the cabin 16. The trim line air is distributed to zones of the cabin 16 via valves 37. The valves 37 allow the temperature of zones of the aircraft, such as the cockpit, to be increased. At altitudes where ambient air is cold, the air leaving the air cycle machine 20 might be colder than desired. The trim line air can be used to raise the temperature of the air inside the cabin 16.

The humidification system 12 is operable to increase humidity of the trim line air supplied to the cabin 16. Increasing the humidity of the trim line air will increase the humidity of the air inside the cabin 16.

Figure 2:
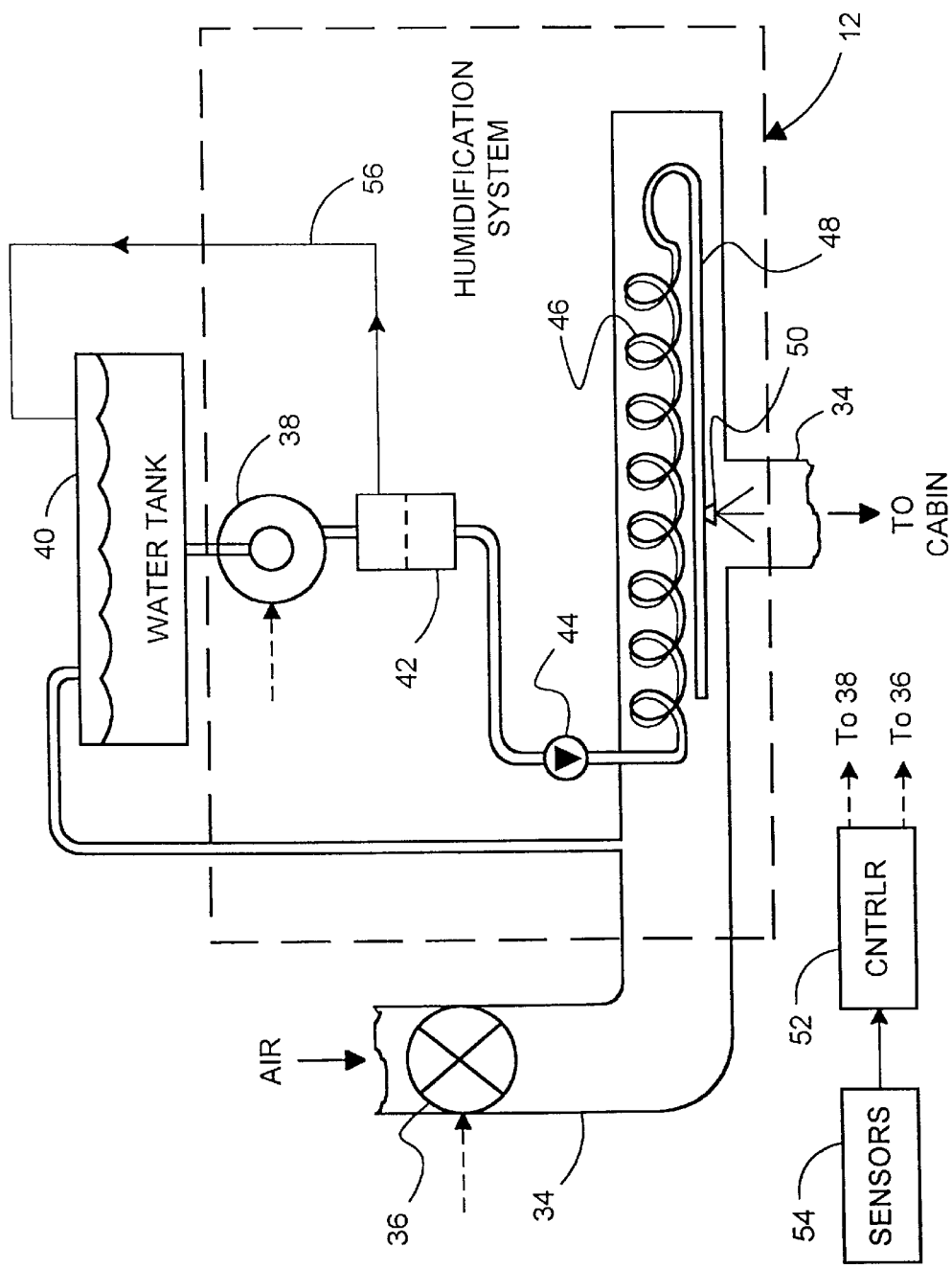
FIG. 2 is an illustration of the humidification system.

FIG. 2 shows the humidification system 12 in greater detail. A pump 38 draws water from a tank 40 and supplies the water to a filter 42. The filter 42 removes undesirable solids and pathogens (e.g., bacteria, viruses) in the water.

Filtered water is then supplied, via a check valve 44, to a boiler tube 46. The boiler tube 46 includes a coiled tube inside a portion of the trim line 34. Bleed air flowing through the trim line 34 might have a temperature of 200° C. at 375 kPa. The bleed air flows through and heats the boiler tube 46, which causes the filtered water inside the boiler tube 46 to be vaporized.

The vaporized water is then circulated through a spray bar 48 located inside the trim line 34. The spray bar 48 sprays the vaporized water onto the air flowing inside the trim line 34. Spraying the water onto the trim line air increases the humidity of the trim line air. Spraying the water also lowers the temperature of the air inside the trim line 26. For instance, the sprayed water might lower the temperature of 200° C. air by 65° C.

The boiler tube 46 and the spray bar 48 can be made of stainless steel or aluminum. The boiler tube 46 can be brazed or welded to the trim line 34. The spray bar 48 can have small orifices for spraying the water. Nozzles 50 can be added to help atomize the water.

The pump 38 and the temperature control valve 36 are controlled by a controller 52. Turning on the pump 38 and opening the temperature control valve 36 allows hot, humid air to flow to the cabin 16 and raise the temperature and humidity of the air inside the cabin 16. Turning off the pump 38 and opening the temperature control valve 36 allows hot, dry air to flow to the cabin 16 and raise the temperature of the air inside the cabin 16. Temperature and humidity of the air inside the cabin 16 are not increased if the temperature control valve 36 is closed. Controlling the speed of the pump 38 controls the amount of water injected into the trim line 34.

The controller 52 controls speed of the pump 38 and set point of the temperature control valve 36 in response to signals from a sensor group 54. The sensor group 54 can include humidity sensors in the zones of the cabin 16. The sensor group 54 can also include temperature sensors that are typically used for controlling the temperature control valve 36.

The filter 42 can be a reverse osmosis filter. The reverse osmosis filter includes a thin membrane that allows water to flow in a forward direction (to the boiler tube 46) and a reverse direction (to the tank 40). A purge loop 56 is provided to remove particles, minerals and other matter that have accumulated inside the filter 42. Thus, the filter 42 is self-cleaning.

Because caked deposits can be purged from the reverse osmosis filter, the humidification system 12 can add tap water into the trim line 34. The tap water is pumped from the water tank 40, which can be an existing water tank of the aircraft. However, the water tank 40 is enlarged to hold additional tap water for the humidification system 12. A regional commuter jet for twenty passengers could, for example, hold an additional two hundred gallons. Of course, the actual amount of water pumped from the tank 40 will depend upon the size and number of the zones. A larger, commercial jet might only supply humidified air to certain zones of the aircraft, such as the cockpit, the first class section or the crew rest section.

FIG. 3 shows a method of increasing the humidity of the cabin air. The controller 52 starts the pump 38, which causes tap water to be pumped from the water tank 40 to the filter 42 (block 100). The tap water is filtered by the filter 42 (block 102), vaporized by the boiler tube 46 (block 104) and sprayed by the spray bar 48 onto hot air inside the trim line 34 (block 106). The controller 52 opens the temperature control valve 36, causing hot, humidified air inside the trim line 34 to be supplied to the cabin 16 (block 108). If the aircraft is a large commercial aircraft, the trim line air might be supplied to only a zone of the cabin 16, such as a first class section, cockpit or crew rest area.

The filter 42 is cleaned by the purge loop 56. The purge loop 56 allows tap water- to backwash the filter 42 (step 110). The backwash is returned to the tank 40.

Thus disclosed is a system that can increase humidity of air inside an aircraft cabin and thereby reduce dryness of the eyes, nose, skin and throat and other forms of discomfort for the passenger and crew.

The humidification system is integrated into the environmental control system, thereby taking advantage of existing manifolds, an existing bleed air source and an existing water tank. Such integration minimizes the amount of weight added to the aircraft and, therefore, minimizes the extra fuel penalty due to the added weight.

The integrated system is especially useful for general aviation aircraft such as regional and corporate aircraft. However, the invention is also useful for commercial aircraft, military aircraft and ground-based vehicles.

The integrated system is not limited to the specific embodiment described above. For example, mixing can be performed without a mix manifold. Water can be added inside the trim line by means other than a spray bar. The humidification system can be located upstream or downstream the temperature control valve. Different types of air cycle machines and water removal equipment can be used. Considerations, such as the type of pump, the size of the water tank, the size of the air-to-air heat exchangers, the size of the boiler tube and spray bar, set point of the temperature control valve, are all dependent upon the application for which the invention is intended. Therefore, the invention is limited only by the claims that follow.

We claim:

1. An integrated system for an aircraft cabin, comprising;
   an environmental control system including a trim line for passing bleed air from a bleed air source to the cabin;
   a humidification system including a reverse osmosis filter, a pump for controllably pumping water through the reverse osmosis filter, and means for adding the water filtered by the reverse osmosis filter into the trim line;
   a temperature control valve for controlling an amount of bleed air flowing through the trim line to the cabin;
   sensor groups located within the cabin; and
   a controller responsive to the sensor groups for controlling speed of the pump and set point of the temperature control valve to control humidity within the cabin.

2. The integrated system of claim 1, wherein the humidification system further includes means for injecting filtered water into the trim line.

3. The integrated system of claim 2, wherein the injecting means includes a spray bar located inside the trim line.

4. The integrated system of claim 1, wherein the humidification system further includes means for vaporizing the filtered water before the filtered water is added into the trim line.

5. The integrated system of claim 4, wherein the vaporizing means includes a boiler tube inside the trim line.

6. The integrated system of claim 4, further comprising a boiler tube midstream between the reverse osmosis filter and the spray bar, the boiler tube also being inside the trim line.

7. The integrated system of claim 1, wherein the humidification system further includes a purge loop for the reverse osmosis filter.

8. The integrated system of claim 1, further comprising a tank for holding tap water, the tap water being controllably pumped through the reverse osmosis filter.

9. The integrated system of claim 1, further comprising means for selectively distributing trim line air to different zones of the cabin.

10. A method of increasing humidity of air inside a cabin of an aircraft, the aircraft Including an environmental control system, the environmental control system including a trim line for passing bleed air from a bleed air source to the cabin, and a temperature control valve for controlling an amount of bleed air flowing through the trim line to the cabin, the method comprising:

pumping water through a reverse osmosis filter;

sensing parameters within the aircraft;

controlling speed of the pump to adjust the amount of water pumped through the reverse osmosis filter;

vaporizing water filtered by the reverse osmosis filter;

injecting the vaporized water into the trim line of the environmental control system; and controlling set point of the temperature control valve to control an amount of bleed air flowing through the trim line to the cabin;

the pump speed and the set point controlled in response to the sensed parameters.

11. The method of claim 10, further comprising the step of using bleed air flowing through the trim line to vaporize the filtered water.

12. The method of claim 10, further comprising the step of supplying air leaving the trim line to an aircraft zone.

13. The method of claim 10, further comprising the step of backwashing the reverse osmosis filter.

* * * * *